United States Patent [19]

Roberts

[11] 4,311,171

[45] Jan. 19, 1982

[54] HYDROSTATIC STEERING CONTROLLER WITH PRESSURE DAMS

[75] Inventor: Maurice P. Roberts, Otterbein, Ind.

[73] Assignee: TRW Inc., Cleveland, Ohio

[21] Appl. No.: 944,703

[22] Filed: Sep. 22, 1978

[51] Int. Cl.³ .............................................. F15B 13/04
[52] U.S. Cl. .................................. 137/625.23; 60/384;
91/467; 137/625.24; 418/61 B
[58] Field of Search ................... 91/467; 137/625.22,
137/625.23, 625.24; 418/61 B; 60/384, 387;
180/132

[56] References Cited

U.S. PATENT DOCUMENTS

| | | | |
|---|---|---|---|
| 3,246,472 | 4/1966 | Kries | 60/386 |
| 3,380,350 | 4/1968 | Stewart | 92/106 |
| 3,385,057 | 5/1968 | Pruvot et al. | 418/61 B |
| 3,600,893 | 8/1971 | Hudgens | 60/387 |
| 3,895,888 | 7/1975 | Roberts | 418/61 B |
| 4,159,723 | 7/1979 | Baatrup et al. | 137/625.24 |

Primary Examiner—Irwin C. Cohen
Attorney, Agent, or Firm—Yount & Tarolli

[57] ABSTRACT

A hydrostatic steering controller including a pair of valve members which are relatively movable in opposite directions from a neutral position to a pair of operating positions to control flow between a fluid pressure source and a hydraulic steering motor. In each of the operating positions the valve members include interfacing surfaces which define part of a first passage directing high pressure fluid to the steering motor and a second passage directing low pressure fluid from the steering motor to a reservoir. The interfacing surfaces of the valve members create a pressure dam between the first and second passages when the valve members are relatively moved by a predetermined amount away from the neutral position and to an operating position. The pressure dam minimizes leakage between the first and second passages. The pressure dam is created in a pressure dam groove formed in a surface of one of the valve members. The pressure dam groove is connected with the fluid pressure source, and is disposed in facing relationship with a low pressure return groove formed in a surface in the other valve member when the valve members are in their neutral position. When the valve members move to their operating position a surface on the other valve member moves into facing relation with the pressure dam groove, thus increasing the pressure in the pressure dam groove.

10 Claims, 19 Drawing Figures

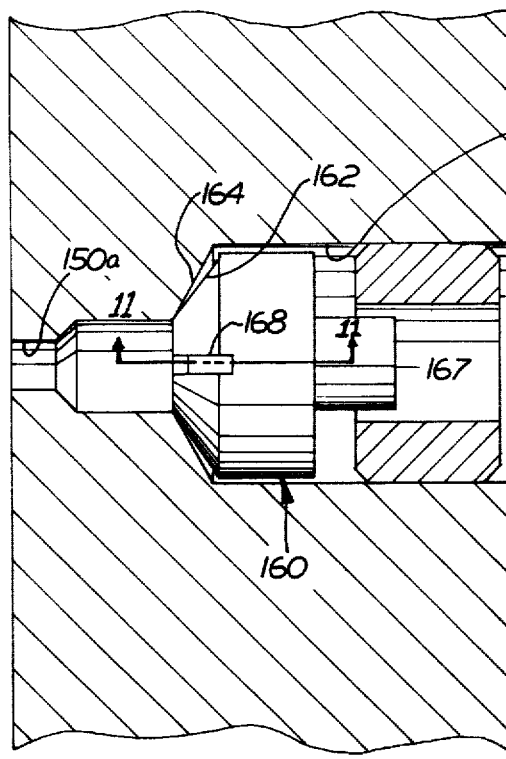
FIG. 9
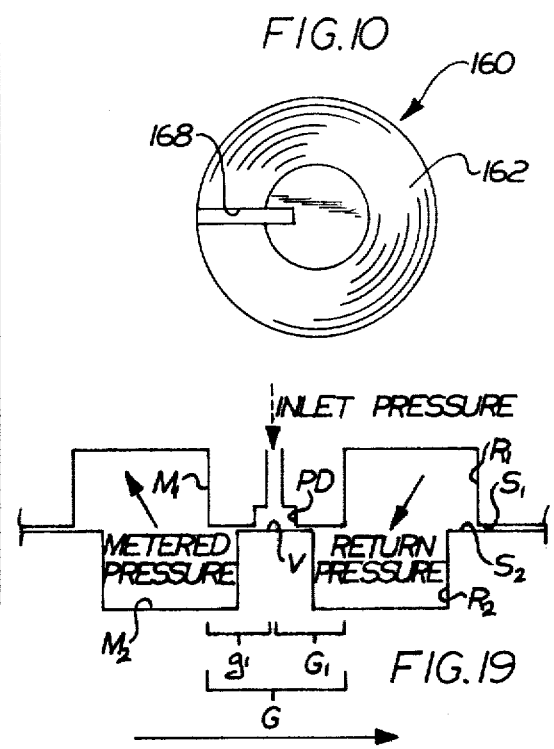
FIG. 10
FIG. 19
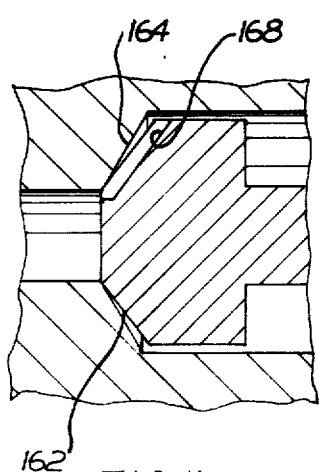
FIG. 11
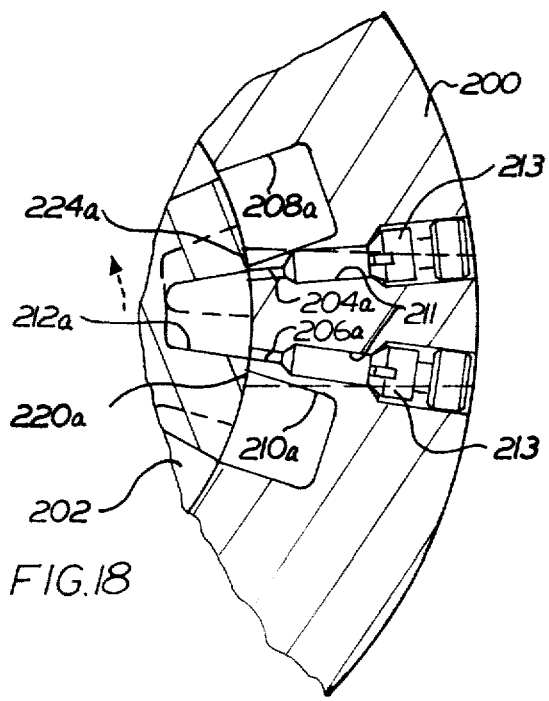
FIG. 18

HYDROSTATIC STEERING CONTROLLER WITH PRESSURE DAMS

BACKGROUND OF THE INVENTION

The present invention relates to hydraulic apparatus such as hydrostatic steering controllers which have relatively movable valve members for directing high pressure fluid from a source to a use location such as a hydraulic steering motor. The present invention relates particularly to a valve structure in which a pressure dam is formed for limiting leakage of high pressure fluid being directed to a use location by the valve structure.

It is known to provide a hydrostatic steering controller with pressure dam grooves for blocking leakage of high pressure fluid being directed by the controller to a hydraulic steering motor. One known type of prior art controller which forms pressure dams is U.S. Pat. No. 3,600,893. The controller disclosed in this patent includes an axially movable control valve member movable relative to a sleeve valve member. The sleeve valve member has a pair of cylinder grooves connected with the chambers of a hydraulic steering motor and a return groove between the cylinder grooves. A pressure dam groove is disposed in the sleeve valve member between each cylinder groove and the return groove. Pressure fluid is directed from the source to both pressure dam grooves. When the valve members are in a neutral position both pressure dam grooves are blocked by the axially movable valve member. Thus, pressure dams are formed when the valve members are in a neutral position. During axial movement of the axially movable valve member to an operating position one of the pressure dam grooves remains blocked and forms a pressure dam between the cylinder groove at high pressure and the return groove. The other pressure dam groove forms part of a flow passage which directs fluid between the cylinder groove at return pressure and the return groove. A valve mechanism is incorporated to restrict fluid communication between the source and the pressure dam groove in the latter condition.

Another type of prior art controller which forms pressure dams is shown in U.S. Pat. No. 3,385,057. The controller disclosed in this patent includes a pair of rotatable valve members, one of which is also axially movable relative to one other valve member to place the controller in an operating condition. A first pair of pressure dam grooves have pressure from the source continually directed thereto are in neutral. One of these pressure dam grooves is vented to return when the controller moves to an operating position. A second pair of pressure dam grooves are formed in grooves which are in continuous interfacing relationship with a fixed cylindrical wall of the controller housing. Relative movement of remote portions of the valve members to an operating position communicates pressure fluid to these grooves to form pressure dams.

SUMMARY OF THE INVENTION

The present invention relates to hydraulic apparatus such as steering controllers having a pair of valve members which are relatively movable away from a neutral position to direct high pressure fluid from a source to a use location, and particularly to an improved valve construction for forming a pressure dam groove for blocking leakage of high pressure fluid being directed to the use location.

According to the invention a pair of valve members are relatively movable away from a neutral position to an operating position. The pair of valve members have interfacing surfaces which cooperate to define a first passage for directing high pressure fluid to a use location (e.g. a hydraulic motor) and a second passage for directing low pressure fluid from the use location to reservoir. The interfacing surfaces of the valve members also cooperate to form pressure dams between the first and second passages when the valve members are moved by a predetermined amount away from neutral and are in an operating position. A pressure dam groove is formed in a surface of one valve member. High pressure fluid is communicated with the pressure dam groove. The pressure dam groove also communicates with a return groove in the interfacing surface of the other valve member when the valve members are in the neutral position. Upon a predetermined amount of relative movement of the valve members away from the neutral position and to an operating position a surface of the other valve member moves into facing relation with the pressure dam groove to create a fluid pressure dam therein for blocking leakage of high pressure fluid from the first passage through which high pressure fluid is directed.

Thus, in hydraulic apparatus constructed according to the present invention the pressure dam is not formed in the neutral condition, as in the controller disclosed in U.S. Pat. No. 3,600,893 and in one of the pressure dam concepts of U.S. Pat. No. 3,385,057. Also, in the invention pressure dams are created by the relative movement of the interfacing valve surfaces which also cooperate to create the first and second passages, rather than by relative movement of remote portions of the valve members, as in the other pressure dam concept of U.S. Pat. No. 3,385,057. In the invention, the pressure dam groove in the surface of one valve member communicates with a low pressure groove in the interfacing surface of the other valve member when the valve members are in neutral. The pressure dam is created in response to movement of the interfacing surfaces of the valve members by a predetermined amount away from the neutral position. In view of this construction, the overall size of the valve members may be minimized since the pressure dam groove can be formed in a valve surface opposite an existing return groove in the interfacing valve surface when the controller is in neutral.

Additionally, in the present invention the pressure dam groove functions only as a pressure dam and does not form part of the flow passage for directing fluid from one cylinder groove to return as with the pressure dam concept of U.S. Pat. No. 3,600,893. This has the advantage of simplifying flow control and minimizing valve member size since the fluid flow is through fewer grooves.

BRIEF DESCRIPTION OF THE DRAWINGS

Further features of the invention will become apparent from the following detailed description, taken with reference to the accompanying drawings wherein:

FIG. 9 is an enlarged fragmentary sectional view of a portion of the sleeve valve member of FIG. 2, taken along the section 9—9;

FIG. 10 is an end view of a part of the structure shown in FIG. 9;

FIG. 11 is a sectional view of a portion of the structure shown in FIG. 9, taken along the section line 11—11 of FIG. 9;

FIG. 18 is an enlarged fragmentary schematic representation similar to FIG. 17, and showing an alternative construction for forming a pressure dam according to the present invention; and FIG. 19 is a diagram illustrating the manner in which a pressure dam such as formed according to the present invention blocks leakage of high pressure fluid.

DETAILED DESCRIPTION OF THE PREFERRED EMBODIMENT

Figure 1:
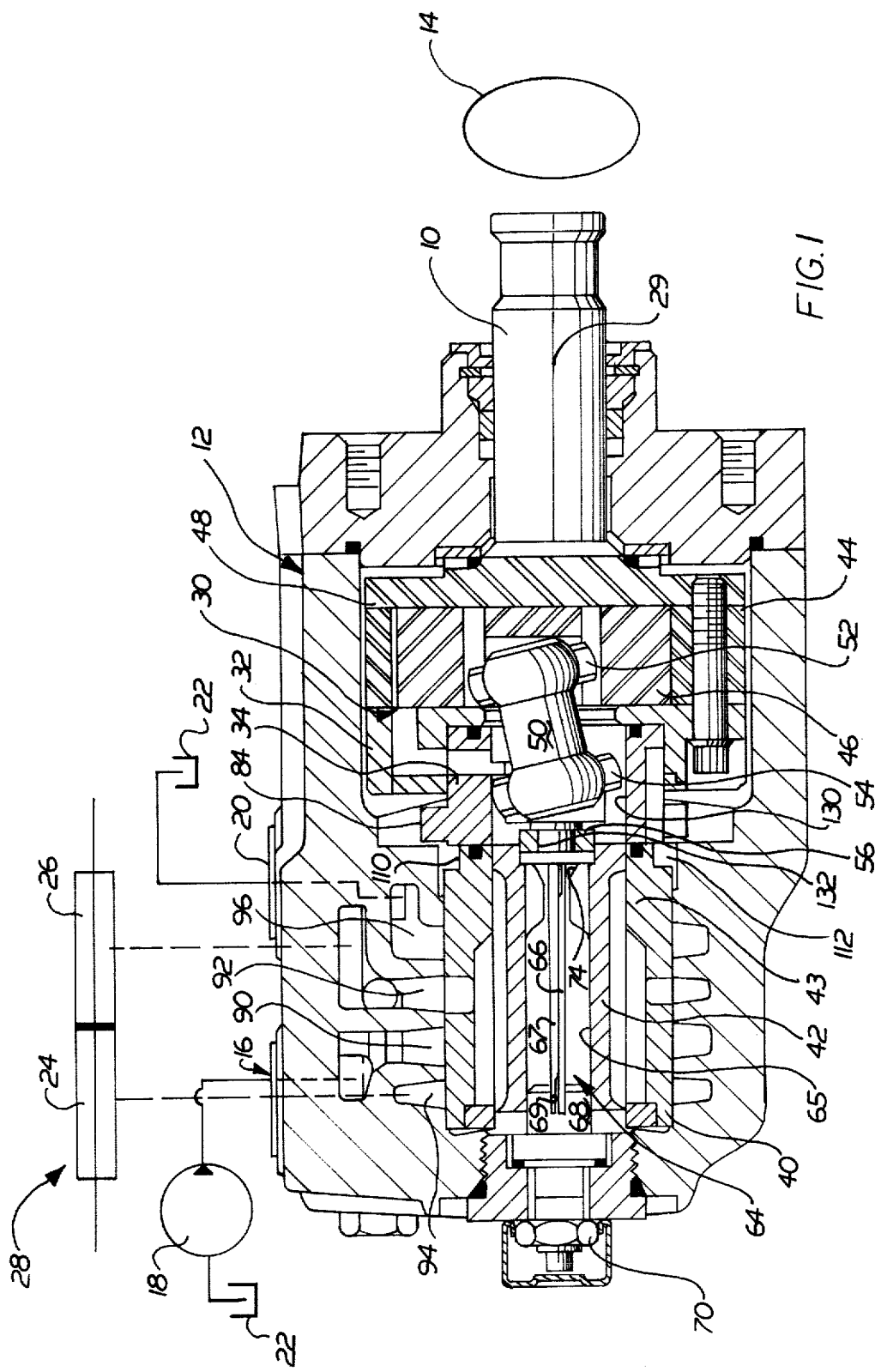
FIG. 1 is a longitudinal sectional view of a hydrostatic steering controller constructed according to the principles of the invention, and shown schematically in a hydrostatic steering circuit.

As noted above the invention relates to a hydraulic apparatus such as a hydrostatic steering controller having a pair of valve members which are relatively movable to control a flow of fluid between a source and a use location (e.g. a hydraulic steering motor). FIG. 1 illustrates a steering controller which is constructed generally in accordance with the principles of U.S. Pat. No. 3,895,888 but includes a pair of relatively movable valve members which form pressure dams according to the principles of the present invention. The steering controller of FIG. 1 is typical of the type of apparatus with which the principles of the invention may be employed.

In FIG. 1 the steering controller includes a rotatable input shaft 10 extending into the controller housing 12. The outer end of the input shaft 10 is coupled to the rotatable steering wheel 14 of a motor vehicle. The controller housing 12 includes an inlet port 16 connected with an engine driven pump 18, and an outlet port 20 connected with a fluid reservoir 22. Further, the housing 12 includes a pair of cylinder ports (not shown) connected to opposite chambers 24, 26 of a hydraulic steering motor 28.

In response to rotation of the steering wheel 14 the input shaft 10 is rotated about its central axis 29, and the controller operates to direct high pressure fluid to one of the motor chambers 24, 26 and to direct fluid from the other motor chamber to reservoir 22. This effects actuation of the motor 28 which, in turn effects movement of the wheels of the vehicle in a known manner through linkage (not shown) of conventional construction.

Disposed within the controller housing 12 is a metering mechanism 30 of the expanding-contracting pocket type, a commutator valve formed by a pair of rotatable valve members 32, 34, which control fluid flow to and from the expanding and contracting pockets of the metering mechanism, and a directional control valve formed by a pair of concentric relatively rotatable valve members 40, 42 constructed according to the principles of the present invention. In the controller of FIG. 1 the valve member 40 is a sleeve valve member which is fixed in the housing, and the valve member 42 is rotatable in a central opening 43 in the sleeve valve member 40.

When no steering is taking place, the valve members 40, 42 are biased to a neutral position. Upon rotation of the steering wheel 14 in either direction the valve member 42 rotates in one direction relative to sleeve valve member 40 to place the valve members in one of a pair of operating positions. In each operating position fluid from the pump 18 is directed to the expanding pockets of the metering mechanism 30 (through the commutator valve), and high pressure fluid flowing out of the contracting pockets of the metering mechanism (also through the commutator valve) is directed to one of the chambers 24, 26 of the steering motor 28. Further, in each operating position low pressure fluid from the other chamber of the motor is directed to the reservoir 22.

The metering mechanism 30 is formed by a gerotor gearset including an outer gear member 44 having internal teeth, and an inner gear member 46 having external teeth which intermesh with the teeth of the outer gear member. The inner gear member 46 is eccentrically disposed relative to the outer gear member, and has one less tooth than the outer gear member 44. The outer gear member 44 is rotatable about its central axis which is coaxial with the central axis 29 of input shaft 10, and the inner gear member 46 is rotatable about its central axis and can also orbit about the central axis of the outer gear member 44. In response to a force couple the gear members 44, 46 thus have relative orbital and rotational movement as is well known in the gerotor gear art. As the gear members 44, 46 rotate and orbit the intermeshing teeth of the gear members define expansible and contractable fluid pockets, as is also well known.

In response to rotation of the steering wheel 14 torque is transmitted through the gearset to the rotatable valve member 42 to rotate the valve member away from the neutral position to place the valve members 40, 42 in one of the operating positions. As seen in FIG. 1, a drive plate 48 is fixed to the input shaft 10. The commutator valve member 32 and the drive plate 48 are both bolted to the rotatable outer gear member 44 according to the principles disclosed in U.S. Pat. No. 3,895,888.

A drive link 50 is disposed at an angle relative to the central axis 29 of the input shaft 10. One end of the drive link 50 has a pin 52 which engages cooperating slots in the inner gear member 46 to connect that end of the drive link 50 with the inner gear member 46 for joint rotation. The other end of the drive link 50 includes a pin 54 which engages slots in commutation valve element 34 to connect the drive link and commutation valve element 34 for joint rotation. Further, a key element 56 extends into mating slots in the commutation valve element 34 and the rotatable valve member 42, respectively, and couples the commutator valve element 34 and the rotatable valve member 42 for joint rotation. When steering wheel 14 is rotated, torque is transmitted through the gearset to the rotatable valve member 42 and urges the valve member away from its neutral position to place the valve members 40, 42 in an operating position.

Figure 14:
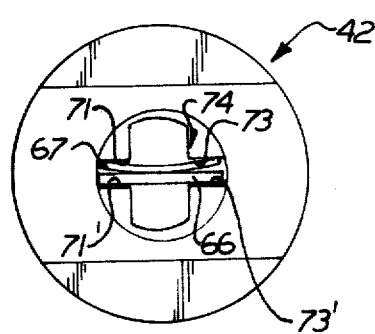
FIG. 14 is an end view of the valve member of FIG. 12 taken from the direction 14—14 of FIG. 12.

A torsion spring 64 urges the rotatable valve element 42 toward its neutral position. Torsion spring 64 is preferably formed by a pair of blades 66, 67 which are disposed in a central opening 65 formed in the valve member 42. The principles of construction of these blades are in accordance with the principles disclosed in U.S. Pat. No. 3,918,856. As seen in FIGS. 1 and 14, an end of each of the blades 66, 67 is disposed in a slot 74 at one end of value member 42. The end of blade 67 is formed to a slightly bowed shape, and must be further pressed or bowed to insert it into slot 74. The ends of blade 67 thus press against shoulders 71, 73 of slot 74, and press blade 66 tightly against the shoulders 71′, 73′. Thus, the blades 66, 67 are in tight engagement with the end of the valve member 42.

The other ends of the blades 66, 67 are disposed in a mating slot 69 in a portion 68 of an adjusting screw which extends into the housing. The portion of blade 66 which extends into slot 69 is formed into a bowed configured and is further pressed or bowed into slot 69 so that blades 66, 67 tightly engage the slot member 68. A threaded end of the adjusting screw extends partly outside of housing 12 and is engaged by a nut 70 which fixes the screw in a position or provides for relative adjustment of its position. Thus, at one end the blades 66, 67 are fixed relative to the housing 12. At the other end the blades are coupled to the valve member 42. Thus, upon application of torque to valve member 42 away from a neutral position the blades 66, 67 are twisted, and when the torque is discontinued, the blades urge the valve member 42 back toward the neutral position.

In response to rotation of the steering wheel 14 the outer gear 44 rotates and the inner gear member 46 rotates only to a limited extent to cause the rotation of valve member 42 to place the valve members 40, 42 in one of the operating positions. Thereafter upon continued rotation of the steering wheel the gear member 46 orbits only. In order to limit the range of rotation of the gear member 46 and the valve element 42, a lug 84 is connected with the commutator valve member 34. Cooperating stops (not shown) fixed to the housing engage the lug 84 after a limited amount of rotation of gear member 46 which effects rotation of valve element 42 in either direction from the neutral position to one of the operating positions. This limits the range of rotation of the gear member 46 and the valve element 42.

As noted above, the valve members 40, 42 cooperate to control flow between the pump 18, the motor 28 and the reservoir 22 when the valve members are in an operating position. A first annular fluid meter space 112 is formed adjacent the commutator valve members 32, 34. A second meter space 130 is formed in a central opening in the commutator valve member 34. In response to rotation of the steering wheel the valve members 40, 42 move to an operating position communicating the inlet port 16 with one of the meter spaces 112, 130. Commutator valve members 32, 34 direct fluid from the one meter space to the expanding pockets of the metering mechanism 30 and direct fluid from the contracting pockets of the metering mechanism to the other meter space. The valve members 40, 42 direct metered fluid from the other meter space to the outlet port. Thus, in either operating position the valve members 40, 42 form part of a first passage directing flow from the inlet port 16 to one of the meter spaces 112, 130 (and therefore to the metering mechanism) and further directing metered flow from the other meter space to one of the cylinder ports. In either operating position the valve members 40, 42 further form a second (or return) passage directing flow from the other cylinder port to the outlet port 20.

The housing 12 includes an annular inlet groove 90 in fluid communication with the inlet port 16, an annular outlet groove 96 in fluid communication with the outlet port 20, and a pair of annular cylinder grooves 92, 94 in fluid communication with respective ones of the cylinder ports.

Figure 2:
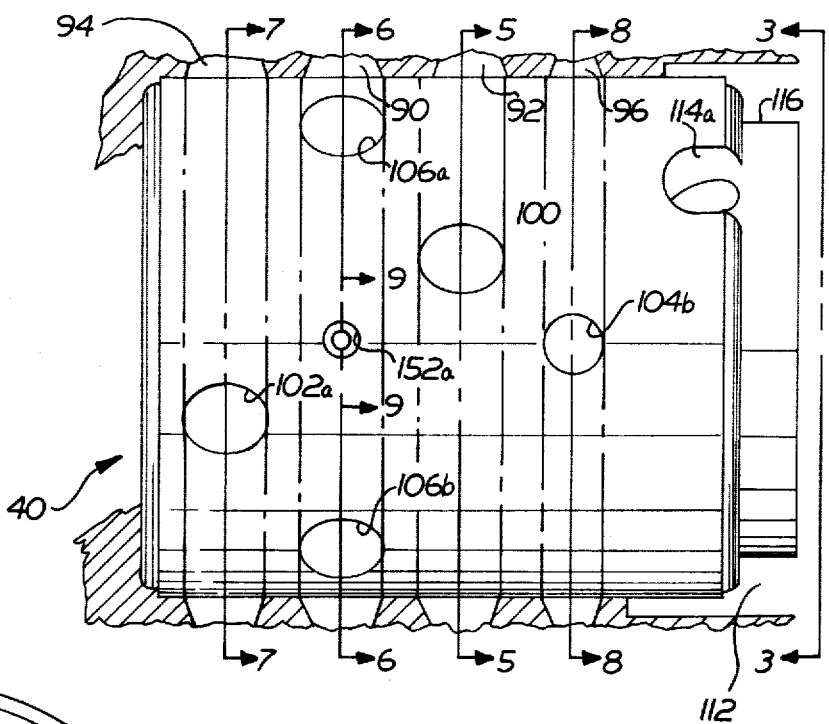
FIG. 2 is a fragmentary sectional view of a portion of the controller of FIG. 1, showing a side elevational view of a sleeve valve member in the controller.
Figure 5:
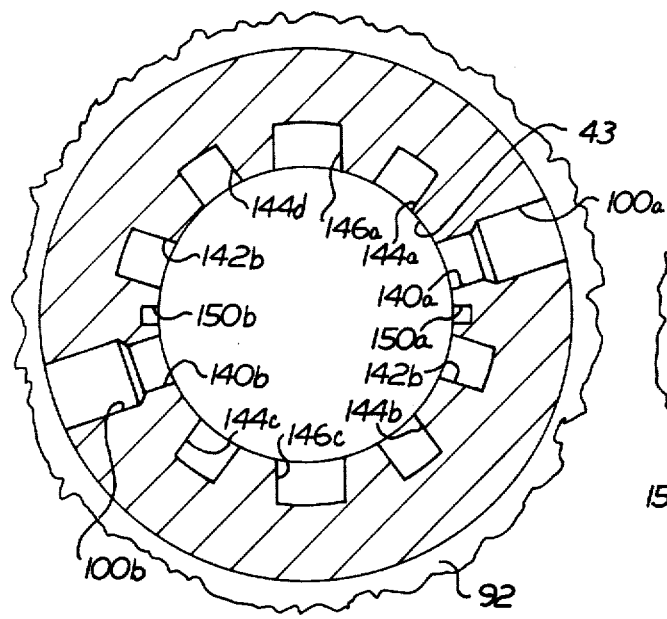
FIGS. 5-8 are sectional views of the sleeve valve member of FIG. 2, taken, respectively, along the section lines 5—5, 6—6, 7—7 and 8—8 of FIG. 2.
Figure 7:
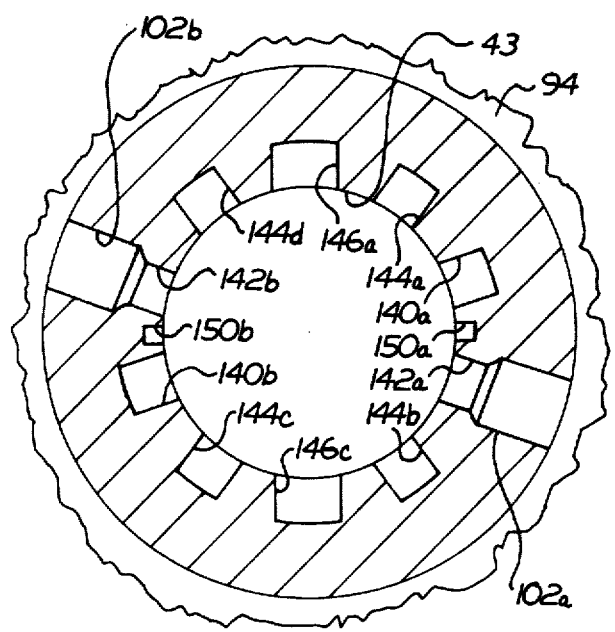
Figure 8:
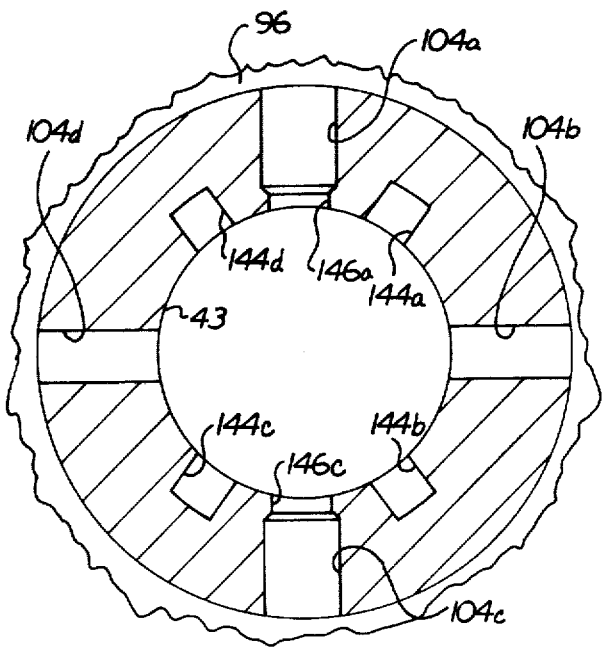

As shown in FIGS. 2 and 5, a first pair of diametrically opposed radial passageways 100a, 100b in sleeve valve member 40 are in fluid communication with one cylinder groove 92 in the housing. Further, a second set of diametrically opposed radial passageways 102a, 102b (see FIGS. 2 and 7) in sleeve valve member 40 are in fluid communication with the other cylinder groove 94 in the housing (see FIGS. 2 and 8). In addition, a series of four equally spaced radial passageways 104a–d are in fluid communication with the outlet groove 96 in the housing. Finally, a series of four equally spaced radial passageways 106a–d are in fluid communication with the annular inlet groove 90 (see FIGS. 2 and 6).

Figure 3:
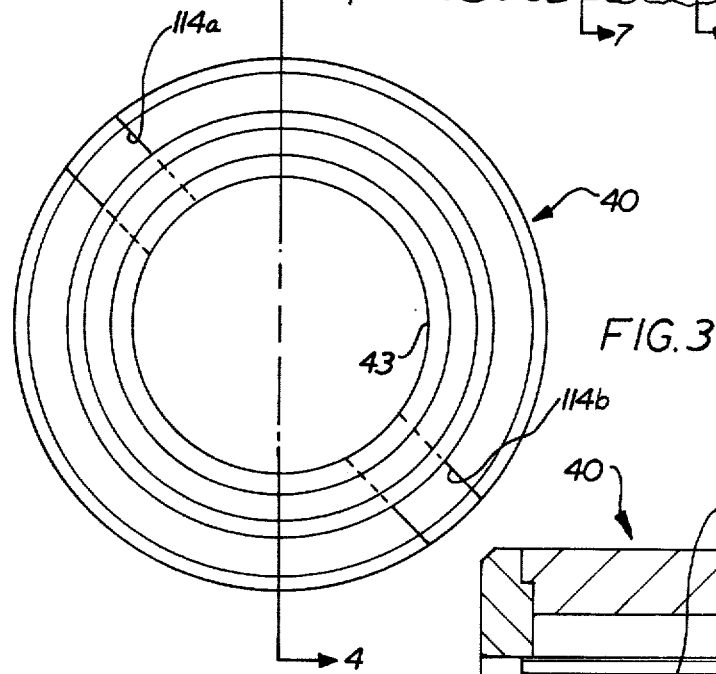
FIG. 3 is an end view of the sleeve valve member of FIG. 2, taken from the direction 3—3 of FIG. 2.
Figure 4:
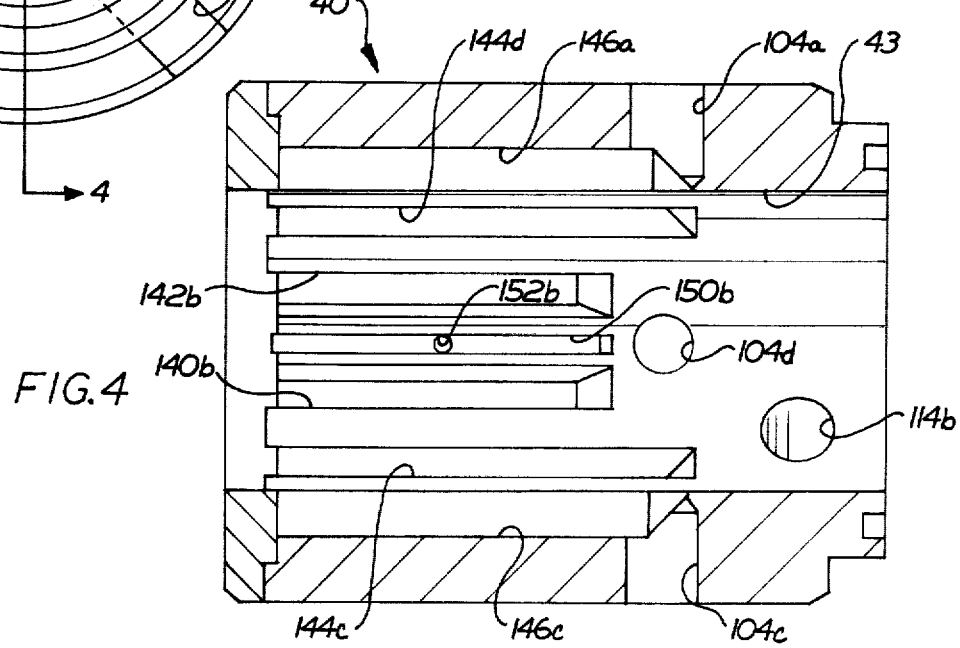
FIG. 4 is a sectional view of the sleeve valve member of FIG. 3, taken along the section line 4—4 of FIG. 3.

Still further as seen in FIG. 1 and 2, the end of the sleeve valve member 40 which is adjacent the commutator valve includes an annular outer surface 110 having a reduced diameter. The surface 110 forms part of the annular meter space 112 disposed adjacent the commutator valve. A pair of diametrically opposed radial passages 114a, 114b communicate the annular meter space 112 with the central opening 43 in the valve element 40, as particularly seen in FIGS. 3, 4.

Certain of the radial passageways in the sleeve valve member 40 communicate with respective axially extending and internally facing grooves in the inner surface of the sleeve valve member 40. Two diametrically opposed cylinder grooves 140a, 140b (see FIG. 5) are in fluid communication with the radial passageways 100a, 100b, respectively. Two diametrically opposed cylinder grooves 142a, 142b (see FIG. 7) are in fluid communication with the radial passageways 102a, 102b, respectively. Four high pressure inlet grooves 144a–d (see FIG. 6) are in fluid communication with the radial passageways 106a–d, respectively. Two diametrically opposed return grooves 146a, 146c (see FIG. 8) communicate with the two diametrically opposed radial passageways 104a, 104c, respectively. The cylinder grooves 140a, 140b and 142a, 142b are slightly shorter in length than the grooves 144a–d and 146a, 146c.

Figure 6:
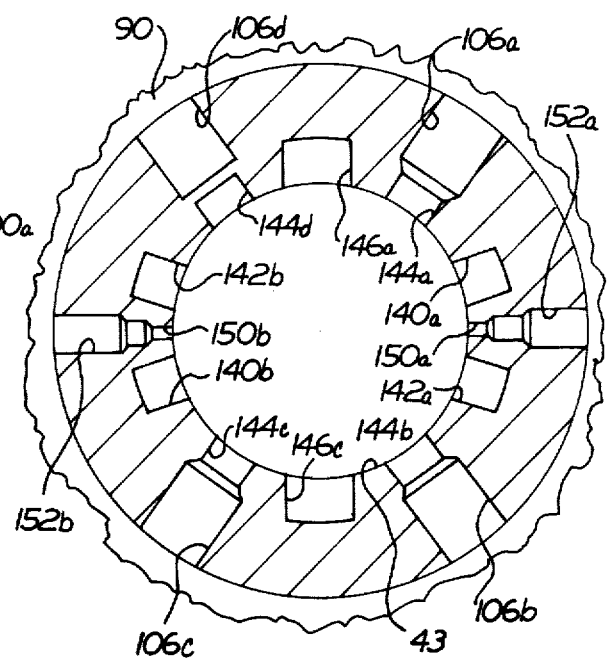

According to the invention the inner surface of sleeve valve member 40 also includes diametrically opposed, axially extending, and internally facing pressure dam grooves 150a, 150b disposed between each pair of cylinder grooves 140a, 142a and 140b, 142b, respectively. Each pressure dam groove is equal in length to the cylinder grooves 140a, 140b and 142a, 142b. Radial passageways 152a, 152b in the sleeve valve member 40 communicate each pressure dam groove 150a, 150b with the annular inlet groove 90 in the housing (FIG. 6). Thus, each pressure dam groove 152a, 152b communicates with high fluid pressure at the inlet port 16.

Referring to FIGS. 9-11, a poppet valve 160 is disposed in each of the radial passages 152a, 152b. Each poppet valve 160 includes a frusto-conical surface 162 at one end which is designed to engage a frusto-conical surface 164 of the respective radial passageway. Each poppet valve 160 further includes a recessed slot 168 in the frusto-conical surface 162. The slot 168 forms an orifice which allows a limited degree of fluid communication between the space 167 on one side of the poppet valve and the respective pressure dam groove 150a, 150b even when the poppet valve is otherwise in tight sealing relation with the surface 164 of the radial passageway 152a, 152b.

The rotatable valve member 42 has an outer surface which is in interfacing relation with the inner surface of sleeve valve 40. The outer surface of valve member 42 includes a plurality of axially extending, circumferentially spaced and outwardly facing grooves. The valve member includes eight (8) grooves 120a–h of substantially equal length and two diametrically opposed grooves 122a, 122b which are longer than grooves 120a–h. When valve members 40, 42 are assembled in the controller of FIG. 1, grooves 122a, 122b communicate, respectively, with radial passages 114a, 114b in the sleeve valve member 42. Thus grooves 122a, 122b communicate with the meter space 112.

Figure 13:
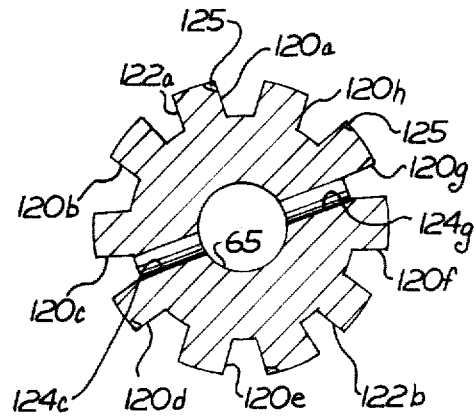
FIG. 13 is a sectional view of the valve member of FIG. 12, taken along the section line 13—13 of FIG. 12.
Figure 12:
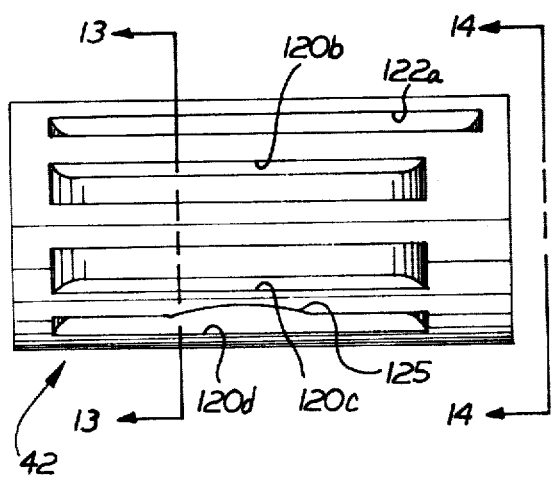
FIG. 12 is a side elevational view of a rotatable valve member used in the controller of FIG. 1.

Referring to FIGS. 12 and 13, the rotatable valve member 42 further includes diametrically opposed radial passages 124c, 124g which communicate the two axial grooves 120c, 120g with the central opening 65 in the valve member. The central opening 65 in the valve member 42 communicates with the meter space 130 through fluid passages 132 in the coupling element 58. Thus meter space 130 communicates with grooves 120c, 120g in the valve element 42.

Each of the grooves 120a, 120d, 120e and 120h also has a notch 125 formed partially along one of its radially outwardmost edges for a purpose which is described more fully hereinafter.

In response to relative movement in either direction to an operating position the valve members 40, 42 form a first path directing metered flow to one motor chamber, a second path directing flow from the other motor chamber to reservoir, and also form pressure dams to block leakage of high pressure metered. The manner in which a pressure dam constructed according to the principles of this invention functions may be understood from FIG. 19. FIG. 19 shows a pair of relatively moveable interfacing surfaces $S_1$, $S_2$ of a pair of valve members. The valve member having surface $S_2$ has been relatively moved from a neutral position to an operating position in the direction shown by the arrow in FIG. 19. The valve surfaces $S_1$, $S_2$ includes respective grooves $M_1$, $M_2$ which are moved into facing relation to direct high pressure metered fluid to a work port. The surfaces $S_1$, $S_2$ also include grooves $R_1$, $R_2$ which are also moved into facing relationship to return low pressure fluid to reservoir.

The pressure dam goove PD is formed in surface $S_1$. The pressure dam groove is continuously communicated with inlet fluid pressure. In the neutral position the pressure dam groove faces return groove $R_2$; thus there is a flow through the groove to reservoir. In an operating position the valve surface V is in facing relationship with the groove PD, so that the static pressure in groove PD quickly builds to inlet pressure.

In the absence of the pressure dam groove there would be a pressure gradient G, from the high pressure metered fluid grooves $M_1$, $M_2$ to the low pressure return grooves $R_1$, $R_2$. This pressure gradient would result in leakage of high pressure metered fluid to the low pressure grooves. In a hydrostatic steering controller leakage of metered flow being directed to a cylinder port can adversely effect the desired response of the steering motor to a steering maneuver. With a pressure dam groove disposed therebetween there is a pressure gradient $G_1$ between the pressure dam groove PD and the low pressure grooves $R_1$, $R_2$. There is either a very small gradient G, or possibly no pressure gradient between the high pressure grooves $M_1$, $M_2$ and the pressure dam groove PD. Consequently, there is essentially minimal leakage from the high pressure groove; any leakage that occurs is from the pressure dam groove to the low pressure groove. The pressure dam groove according to this invention is especially constructed so that any leakage is controlled in a manner that does not effect the desired follow up action of the controller.

Figure 15:
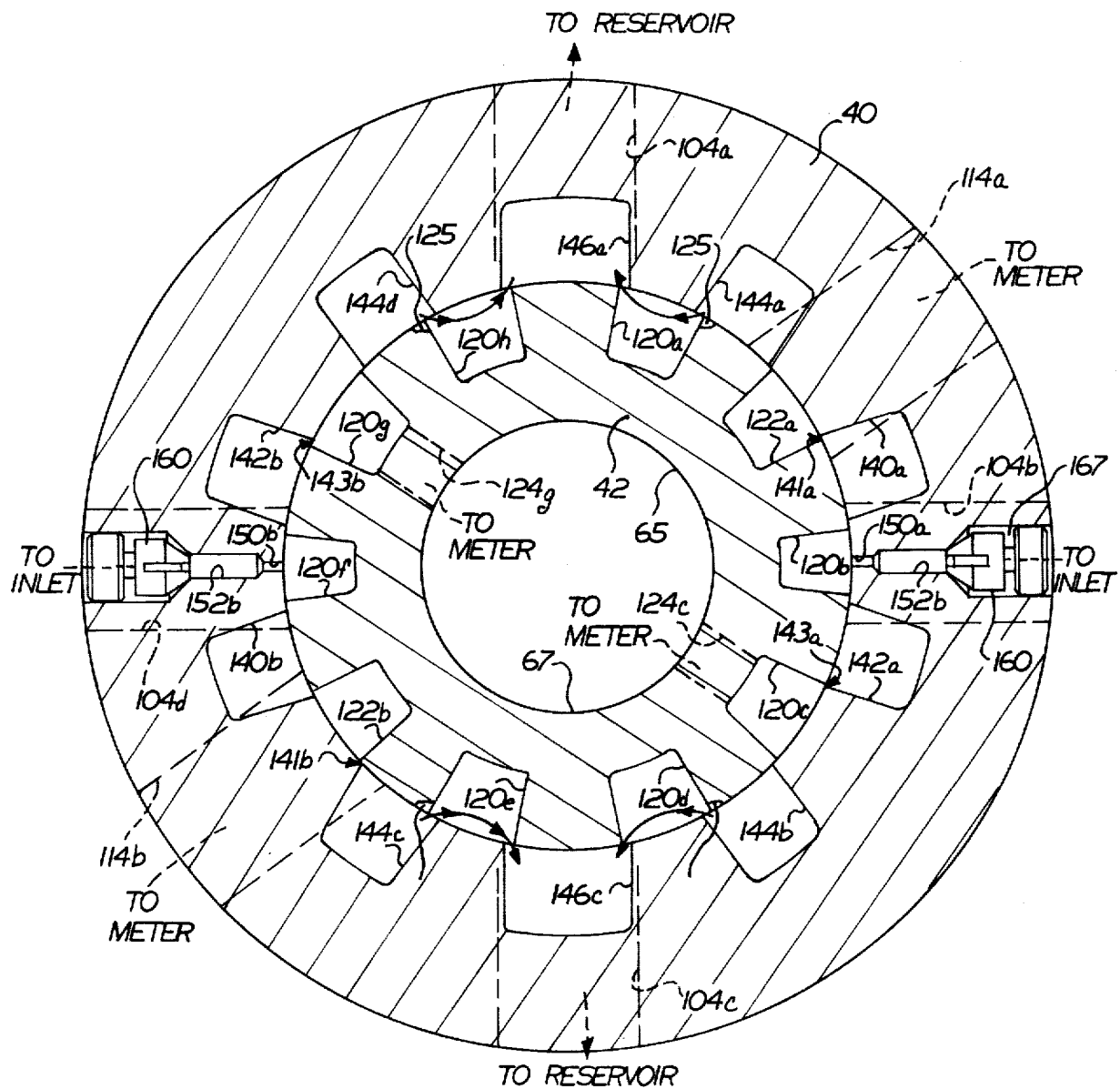
FIG. 15 is an enlarged schematic representation of the valve members of FIGS. 2 and 12 in the controller of FIG. 1, and illustrating the relative positions of the valve members in their neutral position.

The position of the valve members 40, 42 when the controller is in neutral is shown in FIG. 15. Fluid from the inlet port 16 communicates with inlet grooves 144a–d. The grooves 144a, 144b, 144c, and 144d direct flow to the return grooves 146a, 146c through the axial grooves 120a, 120d, 120e, and 120h (and their associated notches 125) in the rotatable valve member 42. Thus, there is a flow of fluid from the inlet port to the reservoir while the valve members are in neutral. This is an "open-center" construction, as is well known.

Additionally the two long grooves 122a, 122b in the rotatable valve member 42, which communicate with one side of the metering mechanism through radial passages 114a, 114b and meter space 112, form small openings 141a, 141b with the cylinder grooves 140a, 140b, respectively. The two grooves 120c, 120g in the spool valve which communicate with the metering mechanism (through radial passages 124c, 124g) form small openings 143a, 143 respectively with cylinder grooves 142a, 142b. Thus, both sides of the metering mechanism are effectively in fluid communication with the motor chambers when the valve members are in neutral. This is known as "open cylinder" construction, which gives the operator a certain "feel" of the road, as is also known.

Diametrically opposed return grooves 120b, 120f in the rotatable valve member 42 are in fluid communication with the return port 20 because the grooves 120b, 120f communicate with annular groove 96 through radial passages 104b, 104d. Return grooves 120b, 120f are in facing relation with the pressure dam grooves 150a, 150b respectively when the controller is in neutral. This means that the pressure dam grooves 150a, 150b communicate with reservoir in the neutral position. Further, in neutral the poppet valve 160 associated with each pressure dam groove may be loosely against the surface 164 of its respective radial passage because the pressure in space 167 (which communicates with the inlet) is slightly higher than reservoir. A small flow of fluid is thus directed through the radial passage in the poppet valve and through the pressure dam grooves 150a, 150b to reservoir when the controller is in neutral.

In response to a steering maneuver the valve member 42 is rotated either clockwise or counterclockwise away from neutral to place the valve members 40, 42 in an operating position. As the valve members rotate to an operating position, the open center flow from inlet to return is shut off. The notches 125 in the grooves 120a, 120d, 120e, 120h in valve member 42 insure that the shut off of fluid to return is gradual, rather than abrupt.

Figure 16:
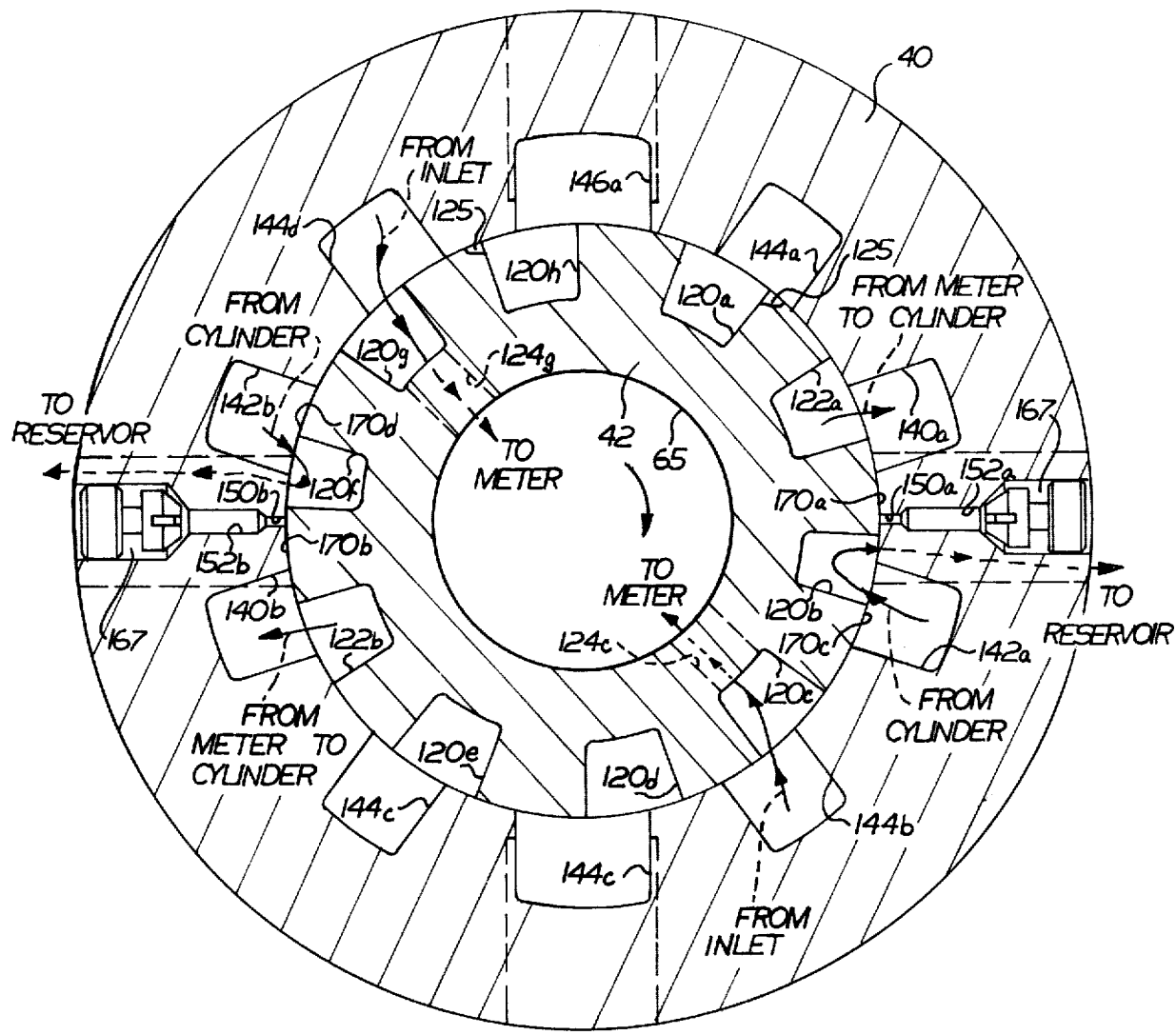
FIG. 16 is an enlarged schematic representation of the valve members of FIG. 15 in an operating position and forming a pressure dam.

In FIG. 16 the valve member 42 has been rotated clockwise away from neutral to the limit of its range of motion in that direction, and the valve members 40, 42 are in an operating position. Fluid from the inlet port flows to meter space 130 through the facing grooves 144d, 120g, and 144b, 120c in the valve members and through radial passages 124c, 124g and central opening 65 in valve member 42. The commutation valve arrangement directs fluid from the meter space 130 to the expanding pockets of the metering mechanism in a known manner and directs metered fluid from the contracting pockets of the metering mechanism to the other meter space 112. Metered fluid is then directed from meter space 112 to the axial grooves 122a, 122b in the valve member 42 (through radial passages 114a, 114b in valve member 40) and thereby to the cylinder grooves 140a, 140b. Fluid from the cylinder grooves 140a, 140b is directed through one cylinder port to the chamber 26 of the steering motor. Return fluid from the other chamber 24 of the motor flows through the facing grooves 142a, 120b and 142b, 120f in the valve members 40, 42 and further through radial grooves 104b, 104d in valve member 42 to the return port 20.

When the valve member 42 has been rotated away from neutral by the predetermined amount which places the valve members 40, 42 in the operating position of FIG. 16 outer surface portions 170a, 170b of the valve member 42 have moved into facing relation with the pressure dam grooves 150a, 150b. Flow through the pressure dam grooves 150a, 150b is blocked. However, the pressure dam grooves 150a, 150b communicate with the inlet port at least through the slots 168 in the poppet valves 160. Thus, static pressure in the pressure dam grooves quickly increases to inlet pressure.

In the operating position of FIG. 16, high pressure metered flow is directed to the cylinder port 26 through cylinder grooves 140a, 140b. Low pressure fluid is being directed to return through interfacing grooves 142a, 142b, and 120b, 120f. The pressure dam grooves 150a, 150b are disposed between the high pressure cylinder grooves 140a, 140b and the low pressure grooves 142a, 142b, 120b, 120f. The pressure in the grooves 150a, 150b is at, or close to, the metered fluid pressure in cylinder grooves 140a, 140b. The pressure therefore prevents leakage of the high pressure metered fluid in the manner discussed above with respect to FIG. 19.

Figure 17:
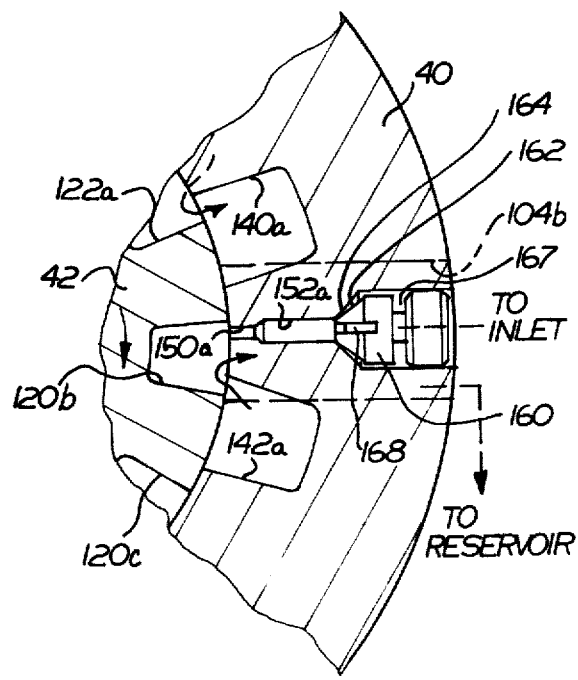
FIG. 17 is a fragmentary schematic representation of the valve members similar to FIG. 15, illustrating the valve members in their relative positions during movement away from their neutral position but before a pressure dam is formed.

As shown in FIG. 17 during initial movement of the valve member 42 away from neutral but before it has rotated by the predetermined amount away from neutral to the operating position of FIG. 16 the pressure dam grooves 150a, 150b are not covered by surfaces 170a, 170b over a portion of the path of travel of the valve member 42. During this portion of the path of travel the poppet valves 160 insure minimum flow of fluid through the pressure dam grooves 150a, 150b to reservoir. In response to initial movement of the valve member 42 away from neutral the pressure in spaces 167 increases quickly and urges the poppet valves 160 into tight sealing relationship with the walls 164 of the radial passages 152a, 152b. The only communication which can occur through the poppet valves 160 is therefore through the slots 168 in the poppet valves. This insures minimal flow through the pressure dam grooves 150a, 150b until the valve member 42 rotates away from neutral by the predetermined amount to the operating position of FIG. 16. In the operating position the pressure build up in the pressure dam grooves 150a, 150b reduces the pressure differential across the poppet valves 160.

Of course, as should be apparent, upon rotation of the valve member 42 away from neutral by a predetermined amount in an opposite direction to the other operating position the valve members 40, 42 will cooperate in a similar manner to direct metered flow to motor chamber 24, and low pressure fluid from motor chamber 26 to reservoir, and to further form pressure dams for blocking leakage of metered fluid. When the valve members are in the other operating position surface portions 170c and 170d will move into facing relation with pressure dam grooves 150a, 150b, respectively to form pressure dam grooves in the manner discussed above.

FIG. 18 shows a portion of a pair of relatively rotatable valve members 200, 202 having interfacing surfaces which co-operate to form pressure dams according to a modified embodiment of the invention. The valve members 200, 202 include respective grooves in their interfacing surfaces which are identical to the grooves in valve members 40, 42 for communicating fluid between an inlet port an outlet port and the cylinder ports in a controller such as shown in FIG. 1. Essentially, the difference between the valve members 200, 202 and the previous described embodiment is that a pair of pressure dam grooves 204a, 206a are provided between each pair of cylinder grooves 208a, 210a. Radial passages 211 communicating inlet with each pressure dam groove each includes a poppet valve 213 constructed as shown in FIGS. 9-11. As shown in full lines in FIG. 18 the valve members 200, 202 are in a neutral position. In this position the pressure dam grooves 204a and 206a both communicate with low pressure return groove 212a in the rotatable valve member 202. When valve member 202 rotates counterclockwise away from neutral by a predetermined amount to place the valve members 200, 202 in an operating position (shown partly in dashed lines in FIG. 18), a surface 220a on the spool valve covers the pressure dam groove 206a. A dam is thus formed in groove 206a in the manner described above. The other pressure dam groove 204a is in facing relation with low pressure return grooves 212a, 212b in the valve 202. The grooves 212a also faces cylinder groove 208a to return fluid to the reservoir. Flow through the unblocked pressure dam groove 204a would be minimal, because the high inlet pressure would urge the poppet valves 213 associated with these grooves into tight sealing relation.

When the controller is rotated in the opposite direction by a predetermined amount the pressure dam groove 204a would be covered by valve surface 224a, to form a pressure dam. The pressure dam groove 206a facing the low pressure groove 212a would have miminal flow therethrough because of the poppet valves. Of course, as will be apparent in the embodiment of FIG. 18, the pressure grooves 204a, 206a, each have diametrically opposed counterparts disposed between cylinder grooves which are diametrically opposite the cylinder grooves 208a and 210a.

With valve members constructed according to the modified embodiment of FIG. 18, pressure dams are formed within a shorter amount of relative movement of the valve members than with the previous embodiment. This may provide even more precise control of slippage by blocking leakage at an earlier point of relative valve movement.

It should be noted that according to the principles of this invention a pressure dam groove essentially performs no function except as to act as a pressure dam groove. Particularly, it does not act as a fluid conduit returning fluid from a cylinder port to a return port during operation of the controller. Thus, it is believed that because of this construction the flow area of the pressure dam groove does not have to be designed to act as a fluid conduit for directing fluid to return. It is therefore believed that according to the principles of this invention a pair of valve members for forming pressure dam grooves can be provided while minimizing the size of the valve members, or without consideration of the fact that the flow passages of the valve members include the pressure dam. For example, the controller shown in U.S. Pat. No. 3,895,888 can be modified to provide pressure dams according to the present invention by simply adding pressure dam grooves in facing relation to low pressure grooves. Further, no design consideration is necessary due to the fact that pressure dam grooves form a part of the flow passages.

It should be further noted that in the event that it were found desirable to positively unseat the poppet valves in a predetermined position of the valve elements (for example, in an operating position), a light spring may be provided.

In view of the foregoing description, it is believed that various obvious modifications will become apparent to those of ordinary skill in the art.

What is claimed is:

1. A controller comprising a housing having an inlet means for connection to a source, first and second cylinder ports for connection to opposite sides of a fluid motor, and an outlet port for connection with a reservoir, said controller including a pair of valve members which are relatively movable away from a neutral position to a pair of operating positions to control fluid communication between said ports, first and second cylinder grooves in one valve member connected respectively with said first and second cylinder ports, a low pressure groove in the other valve member continuously connected with said outlet port when said valve members are in neutral and when said valve members are in said first and second operating positions, first and second high pressure grooves in the other valve member, said first high pressure groove being in facing relation with said first cylinder groove and said low pressure groove being in facing relation with said second cylinder groove when said valve members are in said first operating position and said second high pressure groove being in facing relation with said second cylinder groove and said low pressure groove being in facing relation with said first cylinder groove when said valve members are in said second operating position, and means for forming a pressure dam between the first and second cylinder grooves when said valve members are relatively moved away from neutral by a predetermined amount to one of said first and second operating positions, said means forming a pressure dam including at least one pressure dam groove disposed in said one valve member between said first and second cylinder grooves, a fluid pressure area within said housing, said fluid pressure area being connected with said inlet means, said pressure dam groove being in continuous fluid communication with said fluid pressure area when said valve members are in neutral and when said valve members are in said first and second operating positions, said low pressure groove being in facing relation with said pressure dam groove when said valve members are in said neutral position, said low pressure groove being movable out of facing relation with said pressure dam groove and said other valve member including surface means movable into facing relation with said one pressure dam groove to create a pressure dam chamber within said one pressure dam groove in response to a predetermined amount of relative movement of said valve members away from neutral and to said first or second operating position.

2. A controller as defined in claim 1, wherin a single pressure dam groove is disposed between said first and second cylinder grooves, said valve members being relatively movable in opposite directions from said neutral position to said first and second operating positions, said low pressure groove being movable out of facing relation with said pressure dam groove and said surface means blocking said pressure dam groove in response to a predetermined amount of relative movement of said valve members away from neutral and to either of said first or second operating positions.

3. A controller as defined in claim 1 including valve means for restricting fluid communication between each pressure dam groove and said fluid pressure area for restricting flow through said pressure dam groove when said valve members are in said neutral position, said valve means maintaining at least a predetermined minimum level of fluid communication between said fluid pressure area and said pressure dam groove for communicating pressure to said one pressure dam groove in response to said predetermined amount of relative movement of said valve members away from neutral and to either of said first or second operating positions.

4. A controller comprising a housing having an inlet means for connection to a source, first and second cylinder ports for connection, respectively, with the first and second chambers of a motor, and an outlet port for connection with a reservoir, said controller including a pair of valve members which are relatively movable away from a neutral position to a pair of operating positions to control fluid communication between said ports, first and second cylinder grooves in one valve member connected respectively with said first and second cylinder ports, a low pressure groove in the other valve member continuously connected with said outlet port when said valve members are in neutral and when said valve members are in said first and second operating positions, first and second high pressure grooves in the other valve member, said first high pressure groove being in facing relation with said first cylinder groove and said low pressure groove being in facing relation with said second cylinder groove when said valve members are in said first operation and said second high pressure groove being in facing relation with said second cylinder groove and said low pressure groove being in facing relation with said first cylinder groove when said valve members are in said second operating position, and means for forming a pressure dam between the first and second cylinder grooves when said valve members are relatively moved away from neutral by a predetermined amount to one of said first and second operating positions, said means forming a pressure dam including first and second pressure dam grooves disposed in said one valve member between said first and second cylinder grooves, a fluid pressure area within said housing, said fluid pressure area being connected with said inlet means, each of said pressure dam grooves being in continuous fluid communication with said fluid pressure area when said valve members are in neutral and when said valve members are in said first and second operating positions, said low pressure groove being in facing relation with said first and second pressure dam grooves when said valve members are in said neutral position, said low pressure groove being movable out of facing relation with said first pressure dam groove and said other valve member including first surface means movable into facing relation with said first pressure dam groove to form a pressure dam chamber within said first pressure dam groove in response to a predetermined amount of relative movement of said valve members away from neutral in a first direction to said first operating position and second surface means movable into facing relation with said second pressure dam groove to form a pressure dam chamber within said second dam groove in response to a predetermined amount of relative movement of said valve members away from neutral in a second direction to said operation position.

5. A controller as defined in claim 4 including valve means for restricting fluid communication between said first and second pressure dam grooves and said fluid pressure area for restricting flow through said first and second pressure dam grooves when said valve members are in said neutral position, said valve means maintaining at least a predetermined minimum level of fluid communication between said fluid pressure area and said first and second pressure dam grooves for communicating pressure to said first and second pressure dam grooves when said valve members are relatively movable in either said first or second directions to one of said first and second operating positions.

6. A controller comprising an inlet means for connection to a source, first and second cylinder ports for connection, respectively, with the first and second chambers of a motor, and an outlet port for connection with a reservoir, said controller including valve means comprising a sleeve valve member having a central opening and a rotatable valve member disposed in said central opening in said sleeve valve and said rotatable valve member being relatively rotatable in opposite directions from a neutral position to first and second operating positions to control fluid communication between said ports, first and second cylinder grooves in said sleeve valve member connected respectively with said first and second cylinder ports, a low pressure groove in the rotatable valve member continuously connected with said outlet port when said valve members are in neutral and when said valve members are in said first and second operating positions, first and second high pressure grooves in the rotatable movable member, said first high pressure groove being in facing relation with said first cylinder groove and said low pressure groove being in facing relation with said second cylinder groove when said valve members are in said first operation position and said second high pressure groove being in facing relation with said second cylinder groove and said low pressure groove being in facing relation with said first cylinder groove when said valve members are in said second operating position, metering means for metering high pressure fluid being directed from the inlet port to one of the cylinder ports, said first and second high pressure grooves directing high pressure metered fluid from said metering means to said first and second cylinder grooves when said valve members are in said first and second operating positions, respectively and means for forming a pressure dam between the first and second cylinder grooves when said valve members are relatively moved away from neutral by a predetermined amount to one of said first and second operating positions, said means forming a pressure dam including at least one pressure dam groove disposed in said sleeve valve member between said first and second cylinder grooves, a fluid pressure area within said housing, said fluid pressure area being connected with said inlet means, said pressure dam groove being in continuous fluid communication with said fluid pressure area when said valve members are in said neutral position and when said valve members are in said first and second operating positions, said low pressure groove being in facing relation with said pressure dam groove when said valve members are in said neutral position, said low pressure groove being movable out of facing relation with said one pressure dam groove and said rotatable valve member including surface means movable into facing relation with said one pressure dam groove to form a pressure dam chamber within said one pressure dam groove in response to a predetermined amount of relative movement of said valve members away from neutral and to said first or second operating position.

7. Apparatus as defined in claim 6 wherein said means connecting said pressure dam groove with high pressure fluid includes passage means in said sleeve valve member, said passage means extending between said pressure dam groove and said fluid pressure area, and dam groove valve means restricting fluid flow through said passage means for restricting flow between said pressure dam groove and said return groove when said pressure dam groove and said low pressure groove in said valve member are in facing relation, said dam groove valve means maintaining at least a predetermined minimum level of fluid communication between said pressure dam groove and said fluid pressure area when said valve members move away from said neutral position by said predetermined amount, whereby when said pressure dam groove is blocked by said surface means pressure from the fluid pressure area is communicated with said pressure dam groove.

8. A controller for directing fluid flow from a source to a fluid motor and from the fluid motor to a reservoir including a housing having inlet means for connection to the source, a pair of working ports for connection to opposite sides of the fluid motor and an outlet port for connection to the reservoir, said controller including a metering mechanism and a control valve means including a pair of relatively movable valve members, said valve members having a neutral position blocking flow from said inlet means to said metering mechanism and being relatively movable in opposite directions from said neutral position to first and second operating positions in which they direct metered flow to one of the working ports and connect the other working port with the outlet port, said valve members having interfacing surface portions which in each of said first and second operating positions defines at least part of a first passage for directing a flow of high pressure metered fluid to one of the working ports and at least part of a second passage for directing flow of low pressure fluid from the other working port to the return port, one of said interfacing surface portions of a first one of said valve members having at least one pressure dam chamber portion which cooperates with the interfacing surface of the other valve member when said valve members are in said first or second operating positions to form a pressure dam disposed between said first and second passages, a pressure fluid area within said housing, said fluid pressure area being connected with said inlet means, means in said one of said valve members for continuously communicating said pressure dam chamber portion with said fluid pressure area when said valve members are in neutral and also when said valve members are in said first and second operating positions, a return passage in the interfacing surface of said other valve member, said return passage being in continuous communication with the outlet port when said valve members are in said neutral position and also when said valve members are in said first and second operating positions, said pressure dam chamber portion in the one valve member being in interfacing relation with said return passage when said valve members are in said neutral position, said return passage being movable out of facing relation with said pressure dam chamber portion and the interfacing surface of said other valve member having a surface portion movable into facing relation with said pressure dam chamber to block communication with said pressure dam chamber portion and return port, so that a fluid pressure dam is created within said pressure dam chamber portion when said valve members are relatively moved to said first or second operating positions and the fluid pressure dam chamber portion is communicated with said pressure fluid area to bring the pressure in said fluid pressure dam chamber portion to the pressure of said fluid pressure area for blocking leakage of metered fluid.

9. A control as defined in claim 8 wherein said one valve member includes a passage for connecting said pressure dam chamber portion to said fluid pressure area, restrictor valve means in said pressure for restricting the amount of fluid which can flow from said fluid pressure space through said pressure dam chamber portion to said outlet port when said valve members are in said neutral position, said restrictor valve means including passage means for maintaining at least a level of communication between said fluid pressure area and said pressure dam chamber portion.

10. A controller as defined in claim 8 wherein the interfacing surface of said one valve member includes first and second cylinder recesses connected respectively with said first and second working ports, first and second pressure dam chamber portions including, respectively, first and second pressure dam recesses disposed in said one valve member between said first and second cylinder recesses, each of said first and second pressure dam recesses being disposed adjacent a respective cylinder recess, each of said pressure dam recesses being in continuous fluid communication with said fluid pressure area when said valve members are in said neutral position and when said valve members are in both of said first and second operating positions, said return passage being in facing relation with said first and second pressure dam recesses when said valve members are in said neutral position, the interfacing surface of said other valve member including first surface means movable into facing relation with said first pressure dam recess in response to movement of said valve members away from neutral in a first direction to said first operating position and second surface means movable into facing relation with said second pressure dam recess in response to movement of said valve members away from neutral in a second direction to said second operation position.

* * * * *